United States Patent
Paolella et al.

(10) Patent No.: US 12,519,110 B2
(45) Date of Patent: Jan. 6, 2026

(54) PROTECTIVE MATERIAL FOR A LITHIUM METAL ANODE: METHOD FOR ITS PREPARATION AND USE

(71) Applicant: HYDRO-QUÉBEC, Varennes (CA)

(72) Inventors: Andrea Paolella, Montreal (CA); Catherine Gagnon, Sainte-Julie (CA); Alexis Perea, Montréal (CA); Abdelbast Guerfi, Brossard (CA); Karim Zaghib, Longueuil (CA)

(73) Assignee: HYDRO-QUÉBEC, Montreal (CA)

( * ) Notice: Subject to any disclaimer, the term of this patent is extended or adjusted under 35 U.S.C. 154(b) by 745 days.

(21) Appl. No.: 17/430,838

(22) PCT Filed: Apr. 6, 2020

(86) PCT No.: PCT/CA2020/050456
§ 371 (c)(1),
(2) Date: Aug. 13, 2021

(87) PCT Pub. No.: WO2020/206531
PCT Pub. Date: Oct. 15, 2020

(65) Prior Publication Data
US 2022/0166022 A1    May 26, 2022

Related U.S. Application Data

(60) Provisional application No. 62/830,777, filed on Apr. 8, 2019.

(51) Int. Cl.
*H01M 4/62* (2006.01)
*H01M 4/02* (2006.01)
(Continued)

(52) U.S. Cl.
CPC ............ *H01M 4/62* (2013.01); *H01M 4/134* (2013.01); *H01M 10/0525* (2013.01);
(Continued)

(58) Field of Classification Search
CPC ........ H01M 4/62; H01M 4/134; H01M 4/505; H01M 4/525; H01M 4/131; H01M 4/1395;
(Continued)

(56) References Cited

U.S. PATENT DOCUMENTS

2013/0273422 A1* 10/2013 Wegner ................... H01M 4/38
29/623.5
2015/0093653 A1* 4/2015 Coowar ............. H01M 10/056
429/338

FOREIGN PATENT DOCUMENTS

CN    108329293 A    7/2018
CN    109585786    *    4/2019
(Continued)

OTHER PUBLICATIONS

Extended European Search Report dated Jan. 19, 2023, issued by the European Patent Office in corresponding European Application No. 20786992.6-1102, (6 pages).
(Continued)

*Primary Examiner* — Matthew W Van Oudenaren
(74) *Attorney, Agent, or Firm* — Womble Bond Dickinson (US) LLP

(57) ABSTRACT

A protective material for protecting a lithium metal sheet, in particular a lithium metal anode. The material comprises a metal fluoride such as $AlF_3$ and a fluoro alkylene carbonate such as fluoro ethylene carbonate (FEC). A method for using the protective material is provided.

10 Claims, 5 Drawing Sheets

(51) Int. Cl.
| | | |
|---|---|---|
| *H01M 4/134* | (2010.01) | |
| *H01M 4/505* | (2010.01) | |
| *H01M 4/525* | (2010.01) | |
| *H01M 10/0525* | (2010.01) | |
| *H01M 10/0565* | (2010.01) | |

(52) U.S. Cl.
CPC .. *H01M 10/0565* (2013.01); *H01M 2004/027* (2013.01); *H01M 2004/028* (2013.01); *H01M 4/505* (2013.01); *H01M 4/525* (2013.01); *H01M 2300/0082* (2013.01)

(58) Field of Classification Search
CPC ........ H01M 4/382; H01M 4/06; H01M 4/366; H01M 4/405; H01M 10/0525; H01M 10/0565; H01M 10/052; H01M 10/4235; H01M 10/0567; H01M 10/0568; H01M 10/0569; H01M 2004/027; H01M 2004/028; H01M 2300/0082; H01M 2300/0085; H01M 2300/0034; H01M 6/164; H01M 6/166; H01M 6/168
See application file for complete search history.

(56) References Cited

FOREIGN PATENT DOCUMENTS

| | | | |
|---|---|---|---|
| EP | 2980888 A1 | | 2/2016 |
| JP | 2002-141058 | | 5/2002 |
| JP | 2019-537226 | | 12/2019 |
| KR | 20140000233 | | 1/2014 |
| KR | 20150076903 | * | 7/2015 |
| KR | 20150076903 | A | 7/2015 |
| WO | 2015/136922 | | 9/2015 |

OTHER PUBLICATIONS

Xu et al.,"Artificial soft-rigid protective layer for dendrite-free lithium metal oxide"; Lithium Metal Anodes, (2018) , vol. 28, 1705838.
Guerfi et al.,"Improved electrolytes for Li-ion batteries: Mixtures of ionic liquid and organic electrolyte with enhanced safety and electrochemical performance"; J. Power Source, (2010), vol. 195, pp. 845-852.
Wang et al.,"Current density anodes with interconnected Li metal reservoir through overlithiation of mesoporous AlF3 framework"; Sci. Adv., (2017), vol. 3, pp. 1701301.
Zheng et al.,"Functioning Mechanism of AlF3 Coating on the Li- and Mn-Rich Cathode Materials"; Chem. Mater., (2014), vol. 26, pp. 6320-6327.
Lee et al.,"Improvement of long-term cycling performance of Li[Ni0.8Co0.15Al0.05]O2 by AlF3 coating"; J. Power Sources, (2013), vol. 234, 201-207.
Wang et al."AlF3 coated LiV308 nanosheets with signifi cantly improved cycling stability as cathode material for Li-ion battery"; Solid State Ionics, (2013), vol. 236, pp. 37-42.
Tron et al.,"Surface Modification of the LiFePO4 Cathode for the Aqueous Rechargeable Lithium Ion Battery"; ACS Appl. Mater. Interfaces, (2017), vol. 9, pp. 12391-12399.
Li et al.,"AlF3 modification to suppress the gas generation of Li4Ti5O12 anode battery"; Electrochim. Acta, (2014), vol. 139, pp. 104-110.
Ding et al.,"Enhanced performance of graphite anode materials by AlF3 coating for lithium-ion batteries"; J. Mater. Chemistry, (2012), vol. 22, pp. 12745-12751.
Lee et al.,"Tuning Two Interfaces with Fluoroethylene Carbonate Electrolytes for High-X Performance Li/LCO Batteries"; ACS Omega 2019, vol. 4, 3220-3227.
Michan et al.,"Fluoroethylene Carbonate and Vinylene Carbonate Reduction: Understanding Lithium-Ion Battery Electrolyte Additives and Solid Electrolyte Interphase Formation"; Chemistry Of Materials. 2016, vol. 28, p. 8149-8159.
Zhang et al., "Fluoroethylene Carbonate Additives to Render Uniform Li Deposits in Lithium Metal Batteries", Advanced Functional Materials, 2017, p. 1605989.
Kim et al., "Improved Cycling Performance of Lithium-Oxygen Cells by Use of a Lithium Electrode Protected with Conductive Polymer and Aluminum Fluoride"; ACS Applied Materials and Interfaces., 2016, vol. 8, pp. 32300-32306.
Markevich, E. et al. Very Stable Lithium Metal Strippin—Plating at a High Rate and High Areal Capacity in Fluoroethylene Carbonate-Based Organic Electrolyte Solution ACS Energy Letters, 2017, vol. 2, pp. 1321-1326.
International Search Report and Written Opinion (Forms PCT/ISA/210 and PCT/ISA/237) issued on May 29, 2020, by the International Searching Authority in corresponding International Application No. PCT/CA2020/050456. (10 pages).
Office Action for Japanese Application No. 2021-549790 mailed May 14, 2024.

* cited by examiner

COMPLEX AlF3 : FEC AND DEPOSITION ON LITHIUM METAL

1) AlF3

2) FEC

Orange complex is formed

PROTECTIVE MATERIAL FOR A LITHIUM METAL ANODE: METHOD FOR ITS PREPARATION AND USE

CROSS-REFERENCE TO RELATED APPLICATIONS

This application claims priority from U.S. Provisional Application No. 62/830,777 filed on Apr. 8, 2019, the content of which is hereby incorporated by reference in its entirety.

FIELD OF THE INVENTION

The present invention relates generally to the control of the reactivity between metallic lithium and the electrolyte in a battery. More specifically, the invention relates to a protective material and use thereof for treating the surface of a lithium metal anode. The protective material according to the invention comprises a metal fluoride and a fluoro alkylene carbonate.

BACKGROUND OF THE INVENTION

Lithium metal is used as anode in lithium-ion batteries [1]. However, this use is somewhat limited, for safety reasons. Indeed, formation of lithium dendrite may occur, which causes short circuit in the battery. Efforts to deal with this issue have focused on the nature of the electrolyte [2]. Typically, not flammable electrolytes such as trimethylphosphate (TMP), triethylphosphate (TEP), tributylphosphate (TBP), triethylphosphite (TEPi) are used. However, these electrolytes are generally reactive toward lithium metal; and must be used in combination with carbonate solvents in order to avoid any occurrence of unwanted chemical reactions.

Other research efforts aim at finding methods of controlling the reactivity between metallic lithium and electrolytes. Various such methods are reported, which involve the use of $AlF_3$. For example, Wang et al. have used $AlF_3$ as scaffold for chemical reactions with melted lithium metal forming new composites based on lithium aluminium alloys and lithium fluoride (LAFN) [3]. $AlF_3$ is used in rechargeable batteries to protect the surface of high voltage cathodes such as $Li_{1.2}Ni_{0.15}Co_{0.10}Mn_{0.55}O_2$ [4] and $LiNi_{0.8}Co_{0.15}Al_{0.05}O_2$ [5]. Wang et al. have reported an improvement in the cycling stability of the battery when using a $LiV_3O_8$ cathode coated with $AlF_3$ [6]. Tron et al. have reported an improvement of aqueous $LiFePO_4$ battery performances following a 1-3% weight $AlF_3$ coating of the cathode [7]. $AlF_3$ is used to protect cathodes such as $Li_4Ti_5O_{12}$ cathodes; in particular, Li et al. have reported that gas formation is avoided [8]. Graphite anode was protected by $AlF_3$ when adding a mixture of ammonium fluoride and aluminium nitrate [9].

There is still a need for methods of controlling the reactivity between metallic lithium and the electrolyte in a battery. In particular, there is still a need for methods of protecting the surface of a lithium metal anode in a battery.

Moreover, there is a general need for methods of protecting a lithium metal surface toward reactivity with other reagents.

SUMMARY OF THE INVENTION

The inventors have designed and prepared a material for protecting the surface of a lithium metal sheet. In particular, the inventors have designed and performed a method of treating a lithium metal anode surface such as to avoid the occurrence of unwanted chemical reactions in a battery. The lithium metal anode surface is treated using the material according to the invention.

The method according to the invention involves use of a protective material which comprises a metal fluoride such as aluminum trifluoride ($AlF_3$) and a fluoro alkylene carbonate such as fluoroethylene carbonate (FEC). The method comprises forming a coat of the protective material on the surface of the lithium metal anode.

The invention thus provides the following in accordance with aspects thereof:

(1) Material for protecting a lithium metal sheet, comprising a metal fluoride and a fluoro alkylene carbonate.
(2) The material according to (1), wherein the metal fluoride is selected from the group consisting of $AlF_3$ and $ZnF_2$.
(3) The material according to (1) or (2), wherein the fluoro alkylene carbonate comprises a $C_{2-15}$ fluoro alkylene group which is straight or branched; or the fluoro alkylene carbonate comprises a $C_{2-6}$ fluoro alkylene group; optionally the fluoro alkylene carbonate is cyclic.
(4) Material for protecting a lithium metal sheet, comprising $AlF_3$ and fluoro ethylene carbonate (FEC).
(5) The material according to any one of (1) to (3), wherein the metal fluoride and the fluoro alkylene carbonate are present in amounts of about 1 g and about 0.5-5 mL, respectively; or in amounts of about 1 g and about 2 mL, respectively; or in amounts of about 1 g and about 3 mL, respectively; or in amounts of about 1 g and about 1 mL, respectively; or in amounts of about 1 g and about 0.5 mL, respectively.
(6) The material according to (4), wherein $AlF_3$ and FEC are present in amounts of about 1 g and about 0.5-5 mL, respectively; or in amounts of about 1 g and about 2 mL, respectively; or in amounts of about 1 g and about 3 mL, respectively; or in amounts of about 1 g and about 1 mL, respectively; or in amounts of about 1 g and about 0.5 mL, respectively.
(7) The material according to any one of (1) to (6), wherein the lithium metal sheet is for use as anode in a battery; optionally the battery is a lithium-ion battery.
(8) The material according to any one of (1) to (7), which is stable for a period of at least about 2 weeks; optionally the material is stored under dry atmosphere; optionally the material is stored at ambient temperature.
(9) A method of preparing a material for protecting a lithium metal sheet, comprising: (i) providing a metal fluoride; (ii) providing a fluoro alkylene carbonate; and (iii) mixing the metal fluoride and the fluoro alkylene carbonate to obtain the material, optionally the metal fluoride and the fluoro alkylene carbonate are mixed in a grinding jar (such as a SPEX) equipped with grinding balls (such as zirconia balls), optionally step (iii) is conducted at ambient temperature.
(10) A method of preparing a material for protecting a lithium metal sheet, comprising: (i) providing $AlF_3$; (ii) providing fluoro ethylene carbonate (FEC); and (iii) mixing $AlF_3$ and FEC to obtain the material, optionally $AlF_3$ and FEC are mixed in a grinding jar (such as a SPEX) which is equipped with grinding balls (such as zirconia balls), optionally step (iii) is conducted at ambient temperature.
(11) The method according to (9) or (10), further comprising (iv) storing the material, optionally the material is stored under dry atmosphere, optionally the material is stored at ambient temperature, optionally the material is stored for a period of at least about 2 weeks.

(12) A method of treating a surface of a lithium metal sheet, comprising: (a) providing a lithium metal sheet; (b) preparing a material which comprises a metal fluoride and a fluoro alkylene carbonate; (c) depositing the material on the surface of the lithium sheet and causing the material to spread on the surface; and (d) drying the material, thereby forming a coat of protective material on the surface.

(13) A method of treating a surface of a lithium metal sheet, comprising: (a) providing a lithium metal sheet; (b) preparing a material which comprises $AlF_3$ and fluoro ethylene carbonate (FEC); (c) depositing the material on the surface of the lithium sheet and causing the material to spread on the surface; and (d) drying the material, thereby forming a coat of protective material on the surface.

(14) The method according to (12) or (13), wherein step (c) comprises passivating the surface.

(15) The method according to any one of (12) to (14), wherein step (d) is conducted at ambient temperature.

(16) The method according to any one of (12) to (15), wherein the lithium metal sheet is for use as anode in a battery; optionally the battery is a lithium-ion battery.

(17) A lithium metal sheet having a surface treated by the method as defined in any one of (12) to (16).

(18) A lithium metal sheet having a surface treated by the method as defined in (13).

(19) A lithium metal sheet having coated on a surface thereof a lithium metal protective material as defined in any one of (1) to (8).

(20) A lithium metal sheet having coated on a surface thereof a lithium metal protective material which comprises $AlF_3$ and fluoro ethylene carbonate (FEC).

(21) The lithium metal sheet according to any one of (17) to (20), which is for use as anode in a battery; optionally the battery is a lithium-ion battery.

(22) A battery comprising a lithium metal anode having a surface thereof treated by the method as defined in any one of (12) to (16).

(23) A battery comprising a lithium metal anode having a surface thereof treated by the method as defined in (13).

(24) A battery comprising a lithium metal anode having coated on a surface thereof a lithium metal protective material as defined in any one of (1) to (8).

(25) A battery comprising a lithium metal anode having coated on a surface thereof a lithium metal protective material which comprises $AlF_3$ and fluoro ethylene carbonate (FEC).

(26) The battery according to any one of (22) to (25), wherein the electrolyte is a not flammable electrolyte and/or the electrolyte is a gel polymer electrolyte; optionally the not flammable electrolyte is selected from the group consisting of trimethylphosphate (TMP), triethylphosphate (TEP), tributylphosphate (TBP), triethylphosphite (TEPi), and combinations thereof.

(27) The battery according to any one of (22) to (26), wherein the cathode is a cathode having a nickel- and/or manganese-based material; optionally the cathode is selected from the group consisting of nickel manganese cobalt (NMC) and nickel cobalt aluminum oxide (NCA).

(28) A battery comprising: a lithium metal anode having coated on a surface thereof a lithium metal protective material which comprises a metal fluoride and a fluoro alkylene carbonate; a not flammable electrolyte and/or a gel polymer electrolyte, optionally the not flammable electrolyte is selected from the group consisting of trimethylphosphate (TMP), triethylphosphate (TEP), tributylphosphate (TBP), triethylphosphite (TEPi), and combinations thereof; and a cathode having a nickel- and/or manganese-based material; optionally the cathode is selected from the group consisting of nickel manganese cobalt (NMC) and nickel cobalt aluminum oxide (NCA).

(29) A battery comprising: a lithium metal anode having coated on a surface thereof a lithium metal protective material which comprises $AlF_3$ and fluoro ethylene carbonate (FEC); a not flammable electrolyte and/or a gel polymer electrolyte, optionally the not flammable electrolyte is selected from the group consisting of trimethylphosphate (TMP), triethylphosphate (TEP), tributylphosphate (TBP), triethylphosphite (TEPi), and combinations thereof; and a cathode having a nickel- and/or manganese-based material, optionally the cathode is selected from the group consisting of nickel manganese cobalt (NMC) and nickel cobalt aluminum oxide (NCA).

(30) A kit for use in the protection of a lithium metal sheet, comprising: (a) a metal fluoride; (b) a fluoro alkylene carbonate; and (c) instructions for use.

(31) A kit for use in the protection of a lithium metal sheet, comprising: (a) $AlF_3$; (b) fluoro ethylene carbonate (FEC); and (c) instructions for use.

(32) A kit according to (30) or (31), wherein the lithium metal sheet is for use as anode in a battery; optionally the battery is a lithium-ion battery.

(33) A kit for use in the protection of a lithium metal sheet, comprising: (a) a material which comprises a metal fluoride and a fluoro alkylene carbonate; and (b) instructions for use.

(34) A kit for use in the protection of a lithium metal sheet, comprising: (a) a material which comprises $AlF_3$ and fluoro ethylene carbonate (FEC); and (b) instructions for use.

(35) A kit according to (33) or (34), wherein the lithium metal sheet is for use as anode in a battery; optionally the battery is a lithium-ion battery.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

Figure 1:
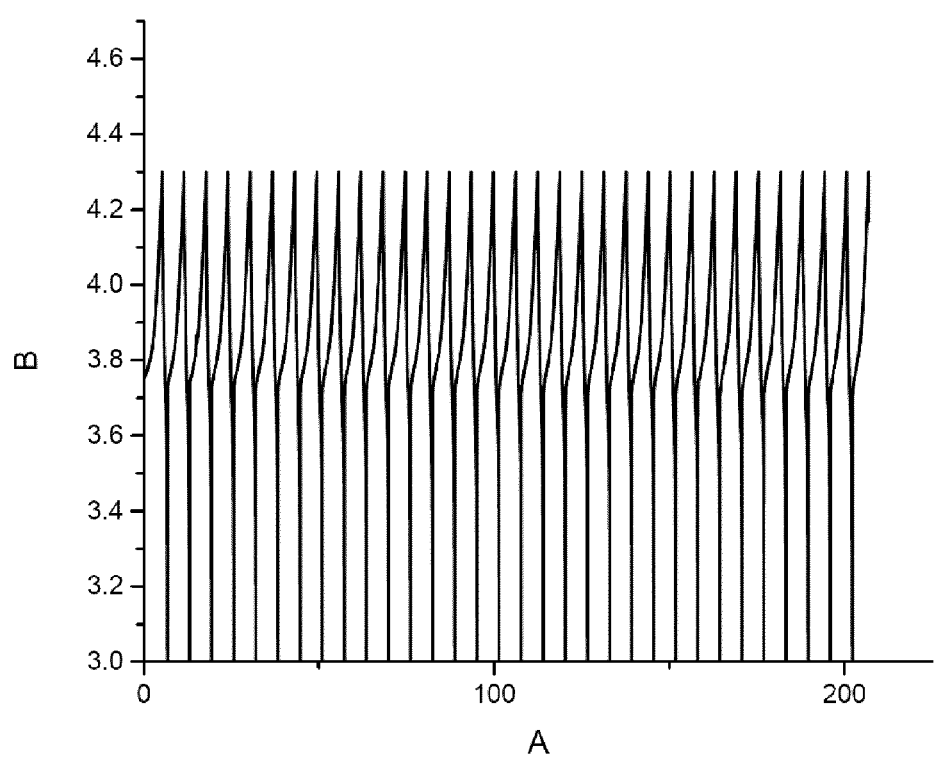
FIG. 1: Charge (C/6) and discharge (C/2) of Li—$AlF_3$ (1 g $AlF_3$-0.5 mL FEC)//TMP//NMC with 1M $LiPF_6$ in TMP. A=time (unit=hour), B=voltage (unit=Volt).

Before the present invention is further described, it is to be understood that the invention is not limited to the particular embodiments described below. Variations of these embodiments may be made and still fall within the scope of the appended claims. It is also to be understood that the terminology employed is for the purpose of describing particular embodiments; and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

Use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

The term "alkylene" as used herein, represents a saturated divalent hydrocarbon group derived from a straight or branched chain saturated hydrocarbon by the removal of two hydrogen atoms, and is exemplified by methylene, ethylene, isopropylene and the like.

As used herein, the term "passivation" or "passivating" refers to the technique of forming a protective layer of material on a surface in order to regulate the chemical reactivity of the surface toward external agents. In particular, the term refers to the technique of forming a layer of the protective material according to the invention on a surface of the lithium anode.

The inventors have designed and prepared a material for protecting the surface of a lithium metal sheet. In particular, the inventors have designed and performed a method of treating a lithium metal anode surface such as to avoid the occurrence of unwanted chemical reactions in a battery. The lithium metal anode surface is treated using the material according to the invention.

The method according to the invention involves use of a protective material which comprises a metal fluoride such as aluminum trifluoride ($AlF_3$) and a fluoro alkylene carbonate such as fluoroethylene carbonate (FEC). The method comprises forming a coat of the protective material on the surface of the lithium metal anode.

Reactive electrolyte toward metallic lithium on surface can be controlled by passivating the lithium metal surface with a mixture comprising aluminium fluoride $AlF_3$ and fluoro ethylene carbonate (FEC). The mixture is prepared by adding the fluoride powder and the solvent in SPEX jar with zirconia balls. A drop of the final mixture is deposited on the lithium metal surface and spread thereby forming a coating on the surface. In other words, the lithium metal surface is passivated with the mixture. The passivated lithium metal is then dried at room temperature and further assembled in battery. Various amounts of $AlF_3$ and FEC can be used to prepare the mixture. For example, about 1 g of $AlF_3$ can be mixed with about 0.5 mL up to about 5 mL of FEC. In embodiments of the invention, 1 g of $AlF_3$ can be mixed with 0.5 mL of FEC or 1 mL of FEC or 2 mL of FEC or 3 mL of FEC.

Figure 3:
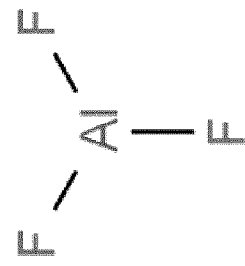
FIG. 3: Protective material according to the invention—a complex is formed between $AlF_3$ and FEC.
Figure 3:
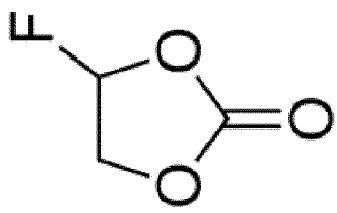

As illustrated in FIG. 3, a complex is formed between $AlF_3$ and FEC.

The present invention constitutes a novel method for protecting a lithium metal anode in order to preserve it during cycling. The invention outlines how the mixture comprising aluminium fluoride ($AlF_3$) and fluoro ethylene carbonate (FEC) is beneficial for the lithium anode surface when a not flammable electrolyte is used.

Wang et al. have used $AlF_3$ as scaffold for chemical reactions with melted lithium metal forming new composites based on lithium aluminium alloys and lithium fluoride (LAFN) as indicated above [3]. The present invention offers a scalable method for protecting a lithium metal core with an artificial Solid Electrolyte Interphase (SEI), i.e., a coat of the protective material according to the invention. In embodiments of the invention, substantially no heating is involved.

The present invention is illustrated in further details by the following non-limiting examples.

Example 1

1 g of $AlF_3$ was mixed with 0.5 mL of fluoro ethylene carbonate (FEC) with SPEX. 10 microliters of the final slurry were deposited on a lithium metal surface and spread thereon. The lithium metal surface was then subjected to drying, at ambient temperature. The lithium metal so treated was used in coin cell battery as anode material in combination with NMC 532 cathode, Celgard 3501 separator and 1M $LiPF_6$ in trimethylphosphate (TMP) electrolyte. 30 cycles of charge (C/6) and discharge (C/2) are reported in FIG. 1.

Example 2

1 g of $AlF_3$ was mixed with 2 mL of fluoro ethylene carbonate (FEC). 10 microliters of the final slurry were deposited on a lithium metal surface and spread thereon. The lithium metal surface was then subjected to drying, at ambient temperature. The lithium metal so treated was tested in coin cell battery as anode material in combination with NMC 532 cathode, Celgard 3501 separator and 1M $LiPF_6$ in trimethylphosphate (TMP) electrolyte. The cycling is reported in FIG. 2.

Figure 2:
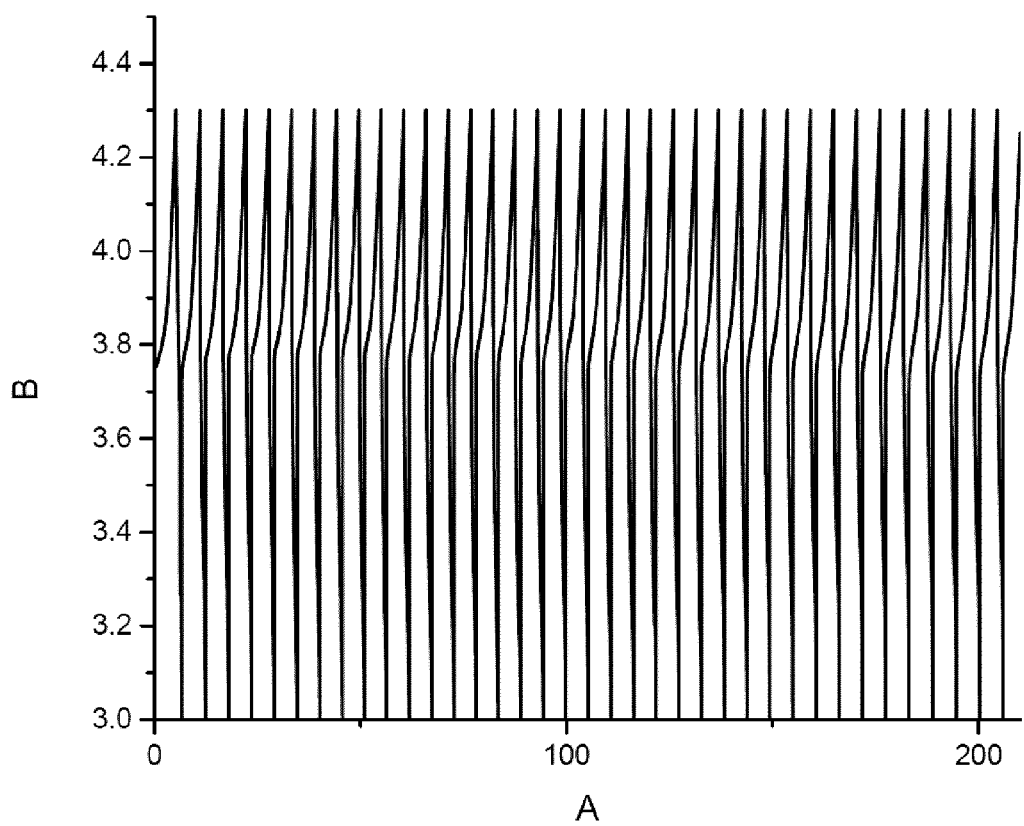
FIG. 2: Charge (C/6) and discharge (C/2) of Li—$AlF_3$ (1 g $ALF_3$-2 mL FEC)//TMP//NMC with 1M $LiPF_6$ in TMP. A=time (unit=hour), B=voltage (unit=Volt).
Figure 4:
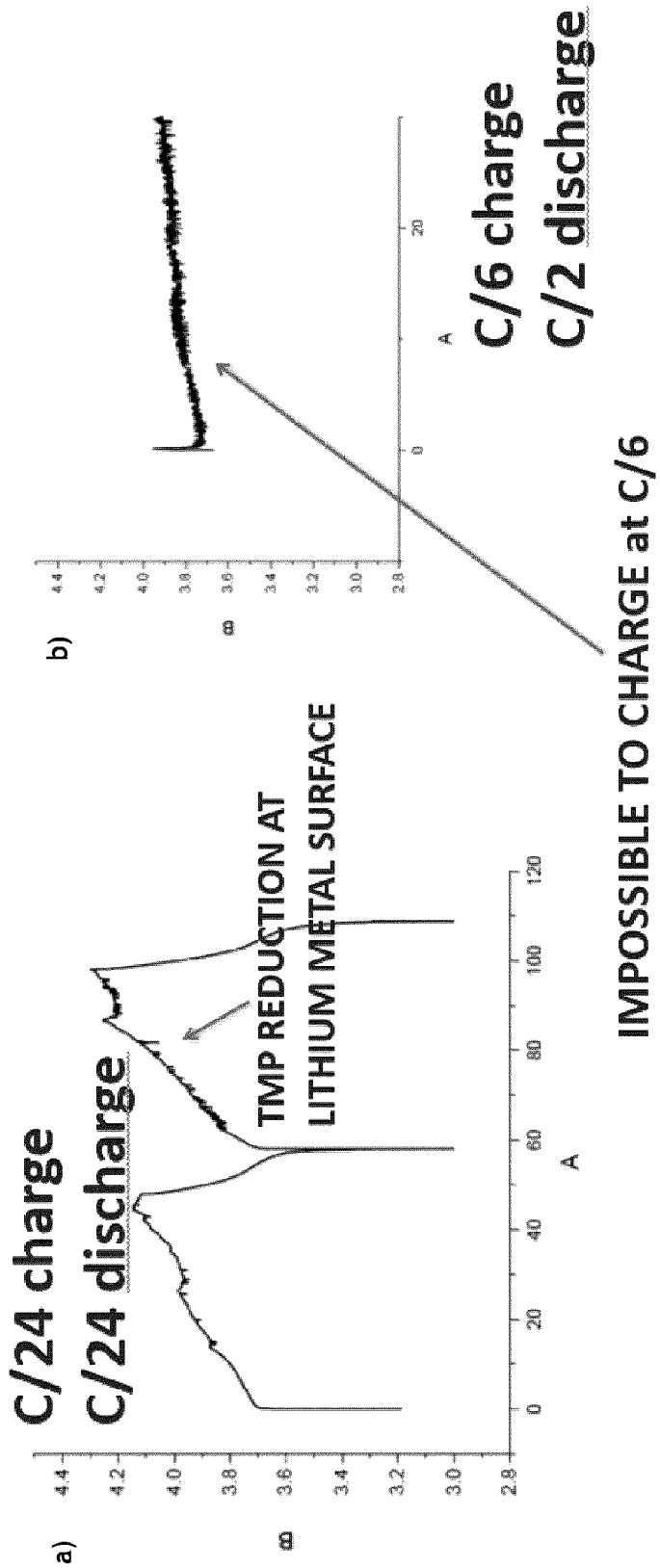
FIG. 4: Performance of a battery having a standard lithium metal anode and a trimethylphosphate (TMP) electrolyte.

Trimethylphosphate (TMP) is a not flammable solvent and known to present a high reactivity towards lithium metal. This is outlined in FIG. 4. However, when used as electrolyte in a battery wherein the lithium anode is treated with the protective material according to the invention, the performance of the battery is enhanced (FIGS. 1-2).

Figure 5:
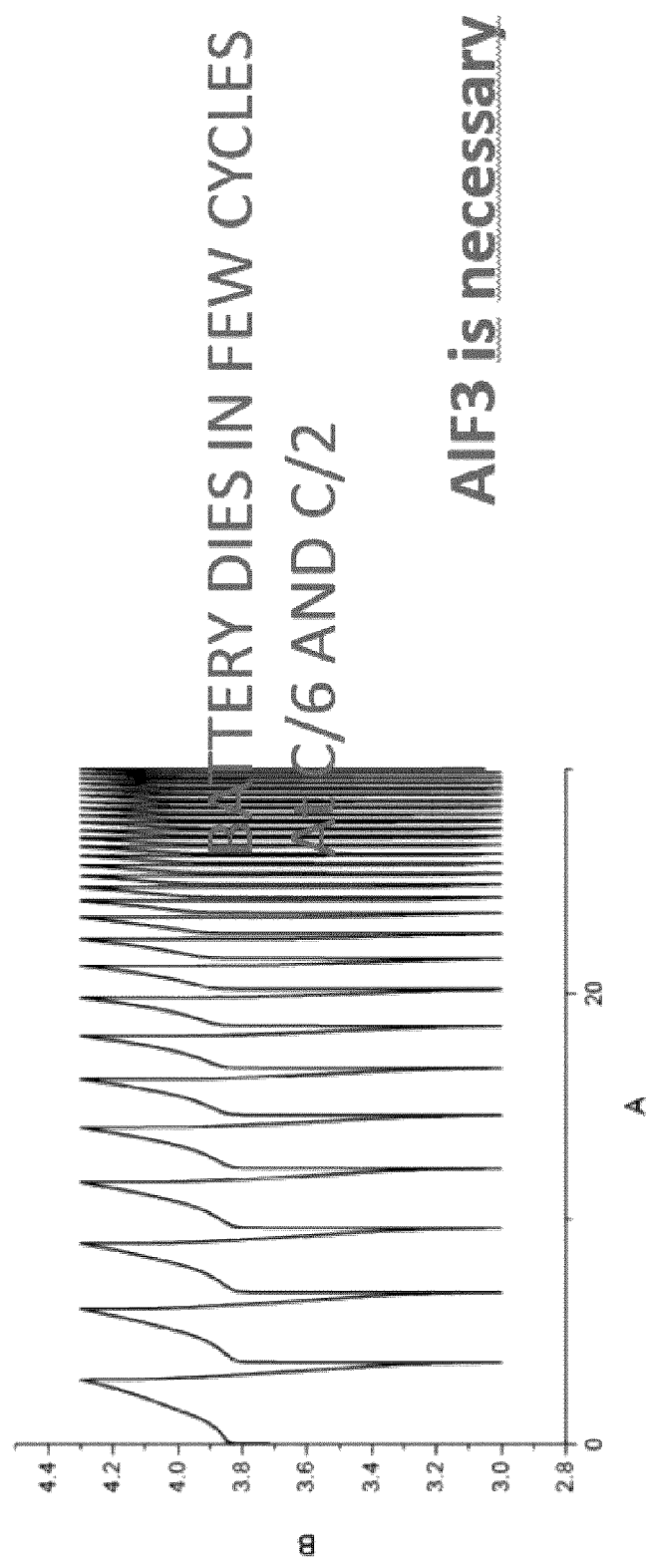
FIG. 5: Performance of a battery having a lithium metal anode treated with FEC only.

FIG. 5 outlines the performance of a battery having a lithium metal anode treated with FEC only. As can be seen, FEC alone does not appear to protect the lithium metal anode from the TMP electrolyte.

In embodiments of the invention, a gel polymer electrolyte may also be used. As will be understood by a skilled person, other suitable electrolytes may be used.

Embodiments of the present invention provide for a material for protecting a lithium metal sheet. The material comprises a metal fluoride and a fluoro alkylene carbonate. The metal fluoride may be $AlF_3$ or $ZnF_2$. The fluoro alkylene carbonate may be a $C_{2-15}$ fluoro alkylene group which is straight or branched. In embodiments of the invention, the fluoro alkylene carbonate may be a $C_{2-6}$ fluoro alkylene group. Optionally, the fluoro alkylene carbonate is cyclic. In embodiments of the invention, the material comprises $AlF_3$ and fluoro ethylene carbonate (FEC) outlined below.

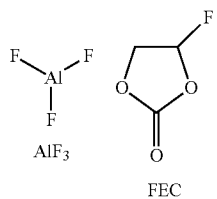

$AlF_3$ and FEC (or the metal fluoride and the fluoro alkylene carbonate) are present in amounts of about 1 g and about 0.5-5 mL, respectively. In embodiments of the invention, $AlF_3$ and FEC (or the metal fluoride and the fluoro alkylene carbonate) are present in amounts of about 1 g and about 2 mL, respectively; or in amounts of about 1 g and about 3 mL, respectively; or in amounts of about 1 g and about 1 mL, respectively; or in amounts of about 1 g and about 0.5 mL, respectively.

The protective material according to the invention is stable for a period of at least about 2 weeks. The material may be stored under dry atmosphere and/or at ambient temperature.

In embodiments of the invention as described above, the lithium metal sheet is for use as anode in a battery. The battery may be a lithium-ion battery.

Embodiments of the invention provide for a method of preparing the protective material. Also, embodiments of the invention provide for a method of treating the surface of a lithium metal sheet; in particular the surface of a lithium metal anode.

Embodiments of the invention provide for a lithium metal sheet, in particular a lithium metal anode treated by the method of the invention. Also, embodiments of the invention provide for a battery which comprises an anode treated by the method of the invention. Optionally, the electrolyte in the battery is a not flammable electrolyte. Such electrolyte may be for example trimethylphosphate (TMP), triethylphosphate (TEP), tributylphosphate (TBP), triethylphosphite (TEPi), or a combination thereof. Optionally, the cathode in the battery is a cathode having a nickel- and/or manganese-based material; preferably the cathode is of nickel manganese cobalt (NMC) or of nickel cobalt aluminum oxide (NCA).

Embodiments of the invention provide for a kit for use in the protective treatment method of the invention. As outlined above, the protective material of the invention is stable when stored under suitable conditions. Accordingly, the kit may comprise either individual components for the preparation of the material, or the material already prepared and ready for use.

The scope of the claims should not be limited by the preferred embodiments set forth in the examples; but should be given the broadest interpretation consistent with the description as a whole.

The present description refers to a number of documents, the content of which is herein incorporated by reference in their entirety.

REFERENCES

1. Xu, R et al. Artificial soft-rigid protective layer for dendrite-free lithium metal oxide. *Lithium Metal Anodes* (2018) 28, 1705838.
2. Guerfi, A. et al. Improved electrolytes for Li-ion batteries: Mixtures of ionic liquid and organic electrolyte with enhanced safety and electrochemical performance. *J. Power Source* (2010) 195, 845-852.
3. Wang, H., Lin, D., Liu, Y., Li, Y. & Cui, Y. Ultrahigh—current density anodes with interconnected Li metal reservoir through overlithiation of mesoporous $AlF_3$ framework. *Sci. Adv.* (2017) 3, e1701301.
4. Wang, C. & Zhang, J. Functioning Mechanism of $AlF_3$ Coating on the Li- and Mn-Rich Cathode Materials. *Chem. Mater.* (2014) 26, 6320-6327.
5. Lee, S., Seung, C., Amine, K. & Sun, Y. Improvement of long-term cycling performance of $Li[Ni_{0.8}Co_{0.15}Al_{0.05}]O_2$ by $AlF_3$ coating. *J. Power Sources* (2013) 234, 201-207.
6. Wang, H. et al. $AlF_3$ coated $LiV_3O_8$ nanosheets with significantly improved cycling stability as cathode material for Li-ion battery. *Solid State Ionics* (2013) 236, 37-42.
7. Tron, A., Jo, Y. N., Oh, S. H., Park, Y. D. & Mun, J. Surface Modification of the $LiFePO_4$ Cathode for the Aqueous Rechargeable Lithium Ion Battery. *ACS Appl. Mater. Interfaces* (2017) 9, 12391-12399.
8. Li, W. et al. $AlF_3$ modification to suppress the gas generation of $Li_4Ti_5O_{12}$ anode battery. *Electrochim. Acta* (2014) 139, 104-110.
9. Chem, J. M. Enhanced performance of graphite anode materials by $AlF_3$ coating for lithium-ion batteries. *J. Mater. Chemistry* (2012) 22, 12745-12751.

The invention claimed is:

1. A material for protecting a lithium metal sheet, the material being a complex formed from a mixture consisting of a metal fluoride and a $C_{2-15}$ fluoro alkylene carbonate, wherein:
   the metal fluoride is selected from the group consisting of $AlF_3$ and $ZnF_2$; and
   the $C_{2-15}$ fluoro alkylene carbonate is a straight chain hydrofluorocarbon or a branched chain hydrofluorocarbon.

2. The material according to claim 1, wherein the metal fluoride is $AlF_3$ and the $C_{2-15}$ fluoro alkylene carbonate is a straight chain hydrofluorocarbon.

3. A material for protecting a lithium metal sheet, the material being a complex formed from a mixture consisting of a metal fluoride and a fluoro alkylene carbonate, wherein:
   the metal fluoride is selected from the group consisting of $AlF_3$ and $ZnF_2$;
   the fluoro alkylene carbonate is a $C_{2-15}$ fluoro alkylene carbonate; and
   the metal fluoride and the fluoro alkylene carbonate are present in amounts of 1 g and 0.5-5 mL, respectively.

4. A material for protecting a lithium metal sheet the material being a complex formed from a mixture consisting of aluminium fluoride ($AlF_3$) and fluoro ethylene carbonate (FEC), wherein $AlF_3$ and FEC are present in amounts of 1 g and 0.5-5 mL, respectively.

5. The material according to claim 1, wherein the lithium metal sheet is for use as anode in a battery; optionally the battery is a lithium-ion battery.

6. The material according to claim 1, which is stable for a period of at least 2 weeks when the material is stored at ambient temperature.

7. A lithium metal sheet having a coating on a surface thereof the material as defined in claim 1.

8. A battery comprising a lithium metal anode having a coating on a surface thereof the material as defined in claim 1.

9. The material according to claim 1, wherein the $C_{2-15}$ fluoro alkylene carbonate is a $C_{2-6}$ fluoro alkylene carbonate.

10. The material according to claim 1, wherein the material is configured to dry at room temperature after deposition on the lithium metal sheet to protect the lithium metal sheet.

* * * * *